(12) United States Patent
Carrick

(10) Patent No.: US 6,546,807 B2
(45) Date of Patent: Apr. 15, 2003

(54) HANDLEBAR MOUNTING ELECTRONIC DIGITAL BARGRAPH TACHOMETER FOR MOTORCYCLES

(76) Inventor: James Andrew Carrick, 1139 Nickel La., Yuba City, CA (US) 95991

( * ) Notice: Subject to any disclaimer, the term of this patent is extended or adjusted under 35 U.S.C. 154(b) by 155 days.

(21) Appl. No.: 09/756,514

(22) Filed: Jan. 9, 2001

(65) Prior Publication Data

US 2002/0088285 A1 Jul. 11, 2002

(51) Int. Cl.[7] ................................................. B62J 11/00
(52) U.S. Cl. ..................................... 73/806.3; 248/904
(58) Field of Search ................................. 73/866.3, 493; 248/904; 324/166, 167, 173, 174; 280/270, 727, 288.4

(56) References Cited

U.S. PATENT DOCUMENTS

| | | | |
|---|---|---|---|
| 1,471,985 A | | 10/1923 | Tower |
| 4,191,157 A | | 3/1980 | Shaw |
| 4,470,011 A | * | 9/1984 | Masuda .................. 324/166 |
| 4,848,154 A | | 7/1989 | Panzica |
| 5,377,558 A | | 1/1995 | Harris |
| 5,413,007 A | | 5/1995 | Vernon |
| 5,437,185 A | | 8/1995 | Panzica |
| D367,418 S | | 2/1996 | Lathrop |
| 5,511,444 A | * | 4/1996 | Clausen et al. |
| 5,855,388 A | * | 1/1999 | Brewer .................. 248/904 |
| 5,881,936 A | * | 3/1999 | Li ....................... 280/288.4 |

* cited by examiner

*Primary Examiner*—Robert Raevis
(74) *Attorney, Agent, or Firm*—Randal D. Homburg

(57) ABSTRACT

The invention is an electronic digital bargraph tachometer apparatus encased within an upper handlebar clamp encasement which replaces the existing upper handlebar clamp for many American made and similar foreign made custom and stock motorcycles having electronic circuitry. The invention attaches to the motorcycle using the original bolts which attach the upper handlebar clamp to the motorcycle risers. The encased electronic digital bargraph tachometer is connected to the motorcycle electronic circuitry by a three wire electrical lead connection extending from the bottom of the upper handlebar clamp encasement.

3 Claims, 3 Drawing Sheets

HANDLEBAR MOUNTING ELECTRONIC DIGITAL BARGRAPH TACHOMETER FOR MOTORCYCLES

CROSS REFERENCE TO RELATED APPLICATIONS

None

I. BACKGROUND OF THE INVENTION

1. Field of Invention

The invention is a compact electronic digital bargraph tachometer encased within a modified reproduction of an existing upper handlebar clamp for many American made and similar foreign made custom and stock motorcycles. The invention replaces the existing upper handlebar clamp with the original mounting holes and brackets on the motorcycle risers. The encased electronic tachometer connects electrically to the motorcycle with three wire standard electrical leads extending from the bottom of the encasement.

2. Description of Prior Art

The following United States patents were discovered and are disclosed within this application for utility patent. All relate to handlebar brackets and tachometers. An ornamental design for a mounting bracket for a motorcycle tachometer is disclosed in U.S. Pat. No. D367,418 to Lathrop. In U.S. Pat. Nos. 5,437,185 and 4,848,154, both to Panzica, a fuel tank mounted speedometer/tachometer is disclosed which specifically denounces a handlebar mounted gauge configuration, in which the tachometer uses magnetic indicators reading coil wire pulses to display engine RPM with a sweep needle display. Four handlebar clamps are disclosed in U.S. Pat. No. 490,750 to Kuhn, U.S. Pat. No. 1,471,985 to Tower, U.S. Pat. No. 5,377,558 to Harris and U.S. Pat. No. 5,413,007 to Vernon, with Harris disclosing a protective device for covering a handlebar bracket.

II. SUMMARY OF THE INVENTION

The primary objective of the invention is to provide a compact electronic digital bargraph tachometer encased in a reproduction of an existing upper handlebar clamp for many American made and similar foreign made custom and stock motorcycles. Additionally, the replacement of the invention as a substitute for an already provided element on the motorcycle handlebars in a non-obtrusive location is a secondary objective of the invention. A third objective of the invention is to provide an after-market accessory item which installs, without modification, to an existing motorcycle.

III. DESCRIPTION OF THE DRAWINGS

The following drawings are submitted with this utility patent application.

IV. DESCRIPTION OF THE PREFERRED EMBODIMENT

The invention, as shown in FIGS. 1–4 of the drawings is a compact electronic digital bargraph tachometer apparatus 10 replacing an existing upper handlebar clamp on many American made and similar foreign made custom and stock motorcycles having electrical circuitry, the invention comprising an electronic digital bargraph tachometer 20, an upper handlebar clamp encasement 40, and a three wire electrical lead 60.

Figure 1:
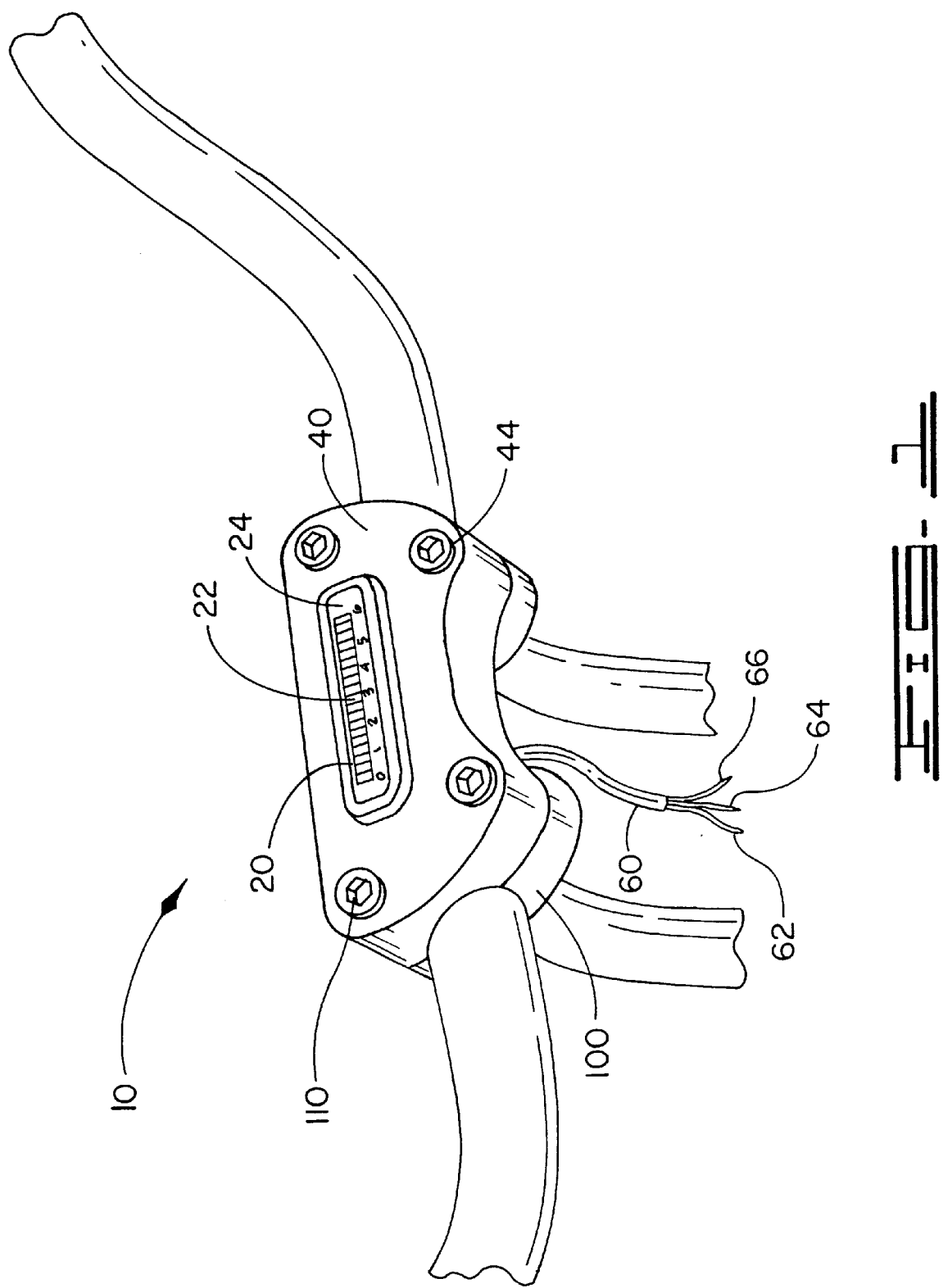
FIG. 1 is a perspective view of the invention on a motorcycle.
Figure 2:
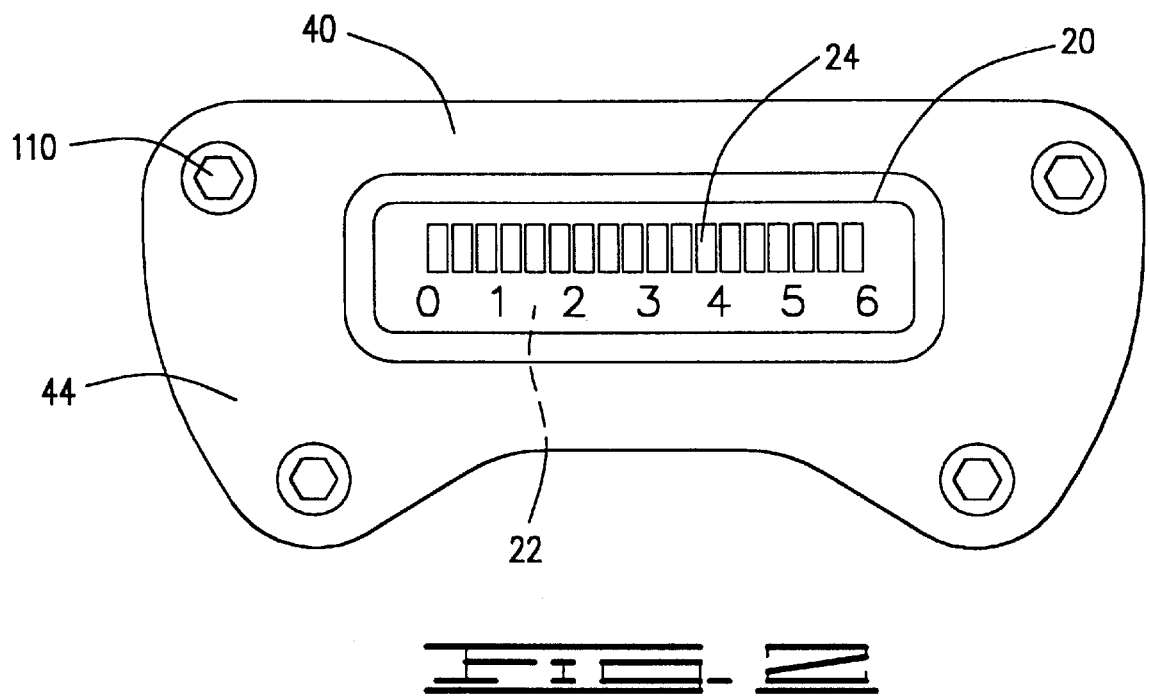
FIG. 2 is a top view of the invention.
Figure 3:
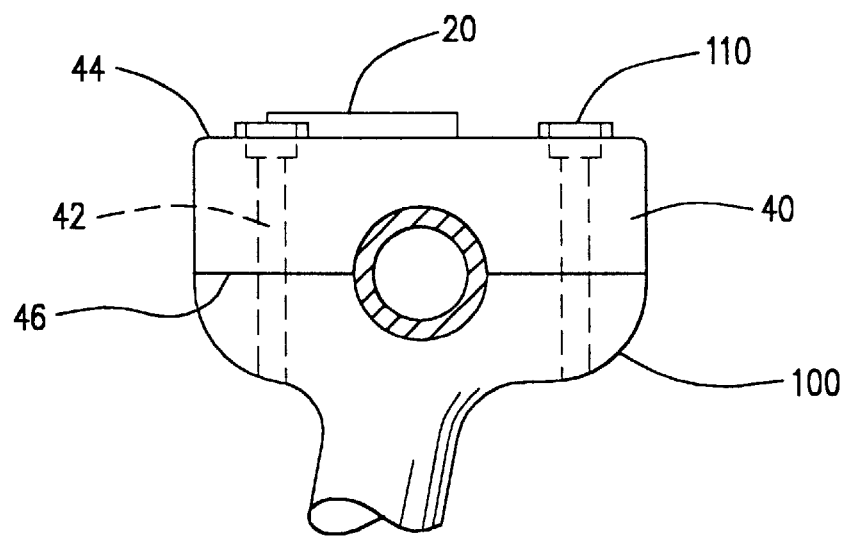
FIG. 3 is a side view of the invention.
Figure 4:
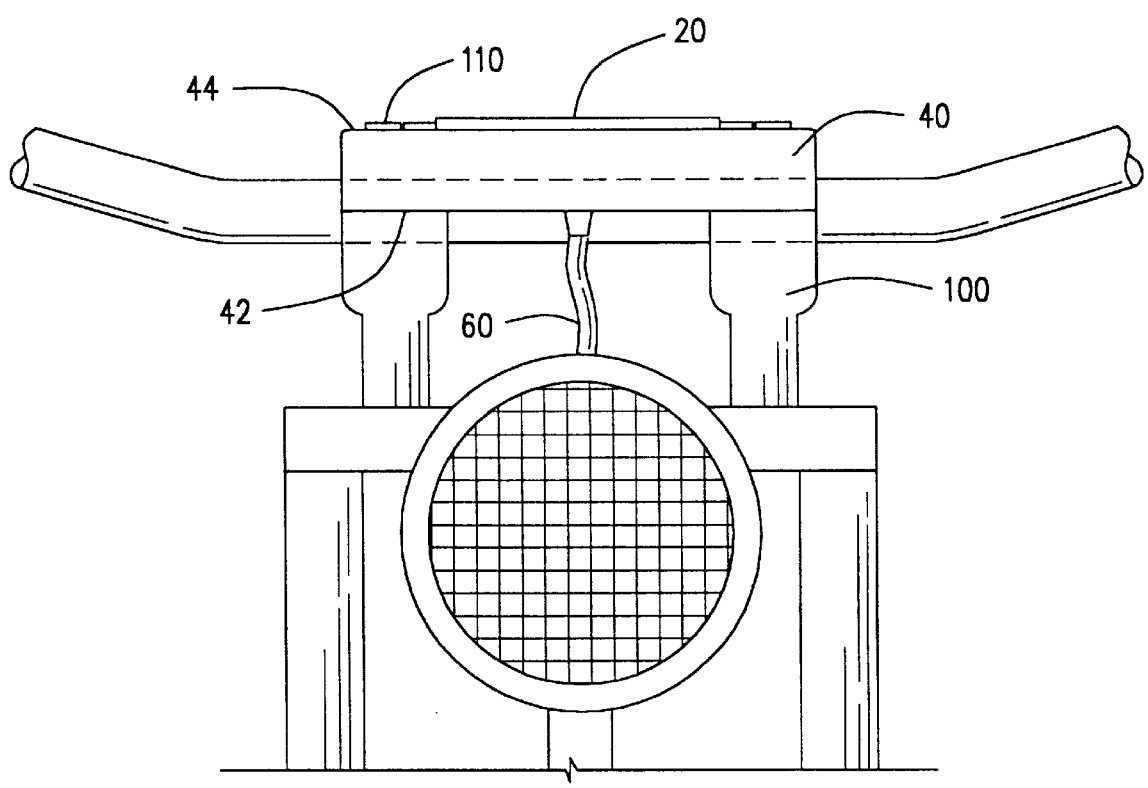
FIG. 4 is a front view of the invention on a motorcycle.

The upper handlebar clamp encasement 40 is preferably metal and houses the electronic digital bargraph tachometer 20, the upper handlebar clamp encasement 40 being similar in size, shape and configuration as an upper handlebar clamp provided as an original part on a motorcycle, the upper handlebar clamp having bolt holes, holding the motorcycle handlebars securely on the front risers 100 of a motorcycle with bolts 110, as shown in FIGS. 1 and 3–4. The upper handlebar clamp encasement 40 is also provided with bolt holes 42 identical in size and orientation as those supplied in the upper handlebar clamp replaced by the upper handlebar clamp encasement 40 with the same bolts 110 which attached the upper handlebar clamp to the front risers 100. The upper handlebar clamp encasement 40 has an upper surface 44 and a lower surface 46, such lower surface 46 conforming in size and shape as the lower surface of the upper handlebar clamp being replaced. The electronic digital bargraph tachometer 20, as shown in FIG. 2 of the drawings, has a means to display RPMs 22 of a motorcycle as an illuminated bargraph display 24. The electronic digital bargraph tachometer 20 is mounted in the upper surface 44 of the upper handlebar clamp encasement 40 with the illuminated bargraph display 24 positioned for view by the motorcycle rider, as shown in FIGS. 1 and 2 of the drawings. Extending through the lower surface 46 of the upper handlebar clamp encasement 40, connecting to the electronic digital bargraph tachometer 20 is the three wire electrical lead 60. This three wire electrical lead 60 connects the means to display the RPMs 22 to the electrical circuitry of the motorcycle. In the preferred embodiment, the three wire electrical lead has three terminal wire ends, a first terminal wire end 62 connecting to a switched positive location on the motorcycle, a second terminal wire end 64 connecting to a negative ground location and a third terminal wire end 66 connecting to a negative coil terminal. In this preferred embodiment, the electrical pulses generated by the motorcycle produce an electrical signal which may be measured and transformed into RPMs utilizing the means to display the RPMs 22 of the motorcycle on the illuminated bargraph display 24.

Thus, to attach the invention to a motorcycle, the user would first remove the existing upper handlebar clamp on the motorcycle, replace the upper handlebar clamp with the upper handlebar clamp encasement 40 apply the bolts 110 passing through the bolt holes 42 on the upper handlebar clamp encasement 40 tightening the upper handlebar clamp encasement 40 against the front risers 110, and affix the first, second and third terminal wire ends 62, 64 and 66 to the switched positive, the negative ground and the negative coil terminal thus connecting the motorcycle electronic circuitry to the electronic digital bargraph tachometer 20.

While the invention has been particularly shown and described with reference to a preferred embodiment thereof, it will be understood by those skilled in the art that changes in form and detail may be made therein without departing from the spirit and scope of the invention.

What is claimed is:

1. The invention is an electronic digital bargraph tachometer apparatus replacing an upper handlebar clamp on a motorcycle having electrical circuitry, the apparatus comprising:

a. an electronic digital bargraph tachometer;
b. an upper handlebar clamp encasement, having an upper surface and a lower surface, the upper surface containing he electronic digital bargraph tachometer;
c. a means to display RPMs of a motorcycle as an illuminated bargraph display on the electronic digital bargraph tachometer; and
d. a three wire electrical lead connecting the means to display the RPMs of the motorcycle as the illuminated bargraph display to electrical circuitry on the motorcycle.

2. The apparatus of claim 1 wherein the upper handlebar clamp encasement is a metal encasement which houses the electronic digital bargraph tachometer, the upper handlebar clamp encasement being similar in size, shape and configuration as an upper handlebar clamp provided as an original part on a motorcycle, the upper handlebar clamp having bolt holes holding the motorcycle handlebars securely on the front risers of a motorcycle with bolts, the upper handlebar clamp encasement also provided with bolt holes identical to those supplied in the upper handlebar clamp being replaced by the upper handlebar clamp encasement using the same bolts which attach the upper handlebar clamp to the front risers.

3. The apparatus of claim 1, wherein the three wire electrical lead has three terminal wire ends, a first terminal wire end connecting to a switched positive location on the motorcycle, a second terminal wire end connecting to a negative ground location and a third the wire end connecting to a negative coil terminal producing an electrical signal which may be measured and transformed into RPMs utilizing the means to display the RPMs of the motorcycle into the illuminated bargraph display.

\* \* \* \* \*